United States Patent [19]
Ito et al.

[11] 3,884,496

[45] May 20, 1975

[54] VEHICLE SUSPENSION SYSTEM

[75] Inventors: Naganori Ito; Hiroshi Aikawa, both of Tokyo, Japan

[73] Assignee: Nissan Motor Company Limited, Yokohama, Japan

[22] Filed: Apr. 8, 1974

[21] Appl. No.: 459,177

[30] Foreign Application Priority Data
Apr. 9, 1973 Japan................................ 48-39432

[52] U.S. Cl................. 280/124 F; 280/6 H; 267/64
[51] Int. Cl............................................. B60g 21/06
[58] Field of Search............ 280/124 F, 6 H; 267/64

[56] References Cited
UNITED STATES PATENTS
2,986,404  5/1961  Chuba............................ 280/124 F
3,466,055  9/1969  Keijzer............................... 280/6 H

*Primary Examiner*—Philip Goodman

[57] ABSTRACT

A spool valve controls fluid flow to and from hydropneumatic shock absorbers provided with level regulators. The valve blocks all fluid communications during curvilinear driving, acceleration or braking in response to fluid pressure difference between two shock absorbers.

8 Claims, 3 Drawing Figures

VEHICLE SUSPENSION SYSTEM

The present invention relates to a hydropneumatic suspension system in a vehicle including hydropneumatic suspension struts which are adapted to be mounted between a vehicle body and wheel supporting means and are capable of supporting the vehicle body at a constant distance above the ground level independently of the weight and/or load of the vehicle.

Conventional hydropneumatic suspension system may function to eliminate traverse inclination of a vehicle body during curvilinear travel of the vehicle or longitudinal inclination during acceleration or braking of the vehicle to hold the vehicle body in a horizontal position. As a result, after the termination of the curvilinear travel, acceleration or braking of the vehicle, the vehicle body is caused to undesirably incline in an opposite transverse or longitudinal direction. Such an inclination of the vehicle body causes deterioration of riding quality. Moreover, when the vehicle shifts from a travel on a curved road to a travel on an oppositely curved road, the vehicle body is caused to excessively incline in a direction of the centrifugal force acting on the vehicle. This causes the travel stability of the vehicle to deteriorate.

It is, therefore, an object of the invention to eliminate the above-mentioned shortcomings encountered in prior art hydropneumatic suspension systems by providing a control valve to stop communication between the level regulating devices of hydropneumatic suspension struts and a source of hydraulic fluid under pressure and a fluid reservoir during curvilinear travel, acceleration or braking of a vehicle.

This and other objects and advantages of the invention will become more apparent from the following detailed description taken in connection with the accompanying drawings in which.

Figure 1:
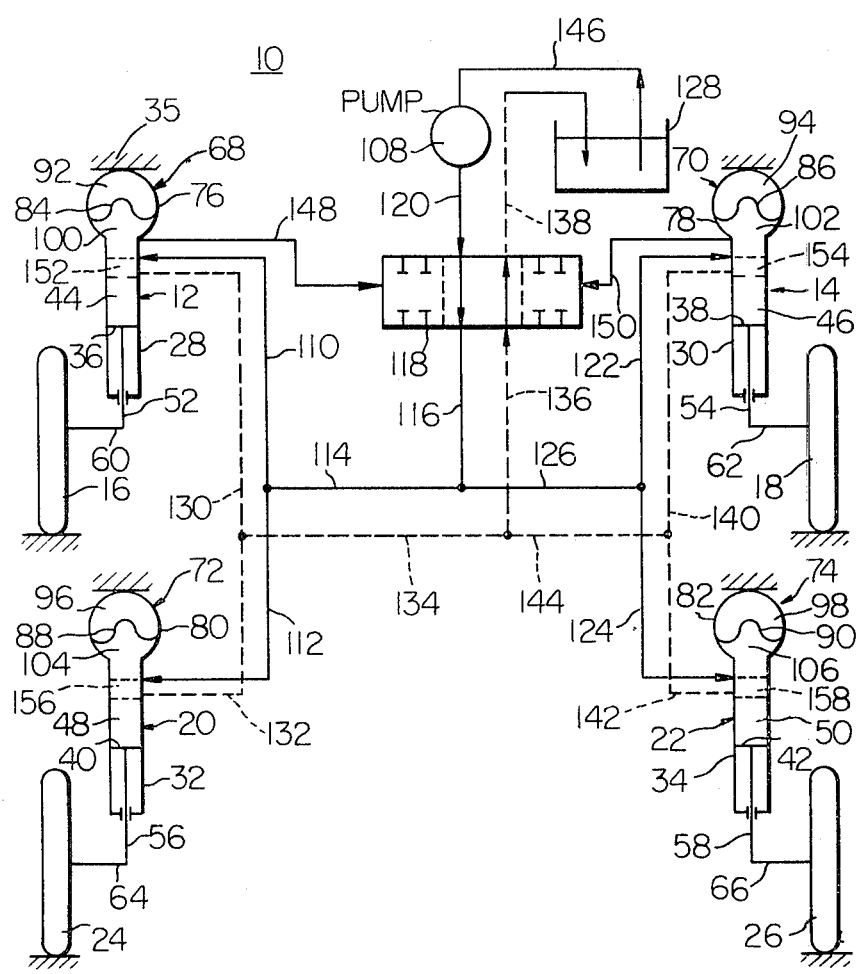
FIG. 1 is a schematic cross sectional view of a preferred embodiment of a hydropneumatic suspension system according to the invention.

Referring now to FIG. 1, a hydropneumatic suspension system 10 according to the invention is shown to comprise first and second hydropneumatic suspension struts or units 12 and 14 which are operatively associated with front left and right wheels 16 and 18 of a vehicle (not shown) and third and fourth hydropneumatic suspension struts or units 20 and 22 which are operatively associated with rear left and right wheels 24 and 26 of the vehicle, respectively. The suspension struts 12, 14, 20 and 22 include cylinders 28, 30, 32 and 34 respectively positioned stationarily relative to a vehicle body 35. Pistons 36, 38, 40 and 42 are axially slidably disposed in the cylinders 28, 30, 32 and 34 and define therein cylinder chambers 44, 46, 48 and 50 of variable volumes filled with hydraulic fluid under pressure, respectively. Piston rods 52, 54, 56 and 58 are connected with the pistons 36, 38, 40 and 42 and extend outwardly through the ends of the cylinders 28, 30, 32 and 34, respectively. The piston rods 52, 54, 56 and 58 are respectively connected to wheel supporting means 60, 62, 64 and 66 such as the axles of the wheels 16, 18, 24 and 26 in a suitable manner. The cylinders 28, 30, 32 and 34 may be located in a stationary position relative to the wheel supporting means, while the piston rods 52, 54, 56 and 58 may be movably connected to the vehicle body in a suitable manner.

The suspension system 10 also comprises hydropneumatic spring means or pressure accumulators 68, 70, 72 and 74 operatively connected to the suspension struts 12, 14, 20 and 22, respectively. The hydropneumatic spring means 68, 70, 72 and 74 have casings 76, 78, 80 and 82 respectively divided by flexible partition members 84, 86, 88 and 90 such as flexible diaphragms into gas chambers 92, 94, 96 and 98 filled with gas under pressure and fluid chambers 100, 102, 104 and 106 filled with hydraulic fluid under pressure. The fluid chambers 100, 102, 104 and 106 communicate respectively with the cylinder chambers 44, 48, 48 and 50. Each hydropneumatic spring means serves to dampen or absorb changes in the pressure or volume of the corresponding cylinder chamber due to momentary relative movements between the corresponding cylinder and piston caused by inequalities of the road surface over which the vehicle travels thereby dampening relative movements of the sprung and unsprung parts of the vehicle.

The cylinder chambers 44 and 48 communicate with a source of hydraulic fluid under pressure such as a pump 108 by way of conduits 110 and 112, respectively and then by way of conduits 114 and 116, a control valve 118 and a conduit 120. The cylinder chambers 46 and 50 communicate with the conduit 116 communicating with the pump 108 by way of conduits 122 and 124, respectively and then by way of a conduit 126. The cylinder chambers 44 and 48 also communicate with a hydraulic fluid reservoir 128 by way of conduits 130 and 132, respectively and then by way of conduits 134 and 136, the control valve 118 and a conduit 138. The cylinder chambers 46 and 50 also communicate with the conduit 136 communicating with the reservoir 128 by way of conduits 140 and 142, respectively and then by way of a conduit 144. The pump 108 draws hydraulic fluid from the reservoir 128 by way of conduit 146 and pumps hydraulic fluid under pressure to the cylinder chambers 44, 46, 48 and 50 through the control valve 118. The pump 108 may be driven by an engine of the vehicle or any other convenient means such as an electric motor. The control valve 118 normally provides communications between the conduits 116 and 120 and between the conduits 136 and 138. The control valve 118 communicates through its ends with the cylinder chambers 44 and 46 by way of conduits 148 and 150, respectively and is operable to stop communication between the conduits 116 and 120 and between the conduits 136 and 138 in response to the difference between the pressure of the hydraulic fluids in the cylinder chambers 44 and 46 during curvilinear travel of the vehicle.

The suspension system 10 also comprises level valves or level regulating devices 152, 154, 156 and 158 located in the suspension struts 12, 14, 20 and 22, respectively. Each level regulating device functions to control communications between the corresponding cylinder chamber and the pump 108 and between the corresponding cylinder chamber and the reservoir 128 in response to variations in the weight and/or load of the vehicle when the control valve 118 is in a position to provide communications between the conduits 116 and 120 and between the conduits 136 and 138.

Figure 2:
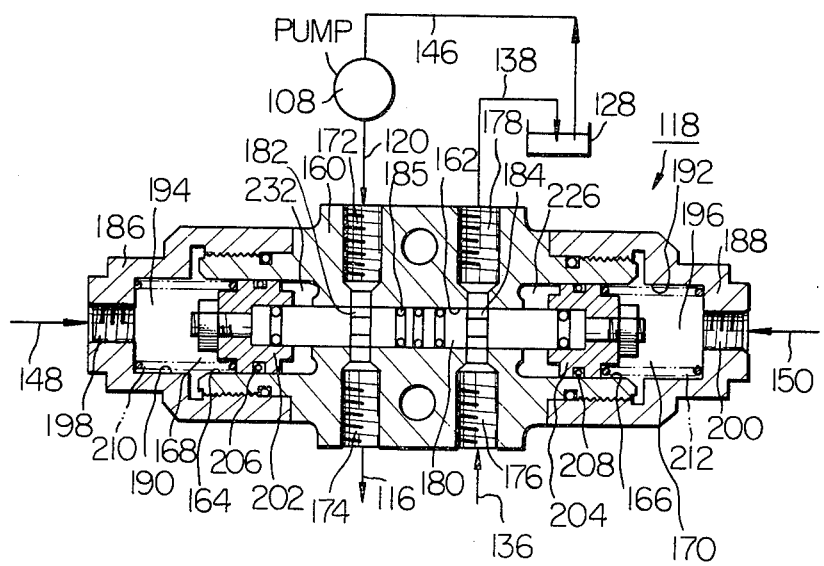
FIG. 2 is a schematic cross sectional elevational view of an example of a control valve forming a part of the hydropneumatic suspension system shown in FIG. 1.
Figure 3:
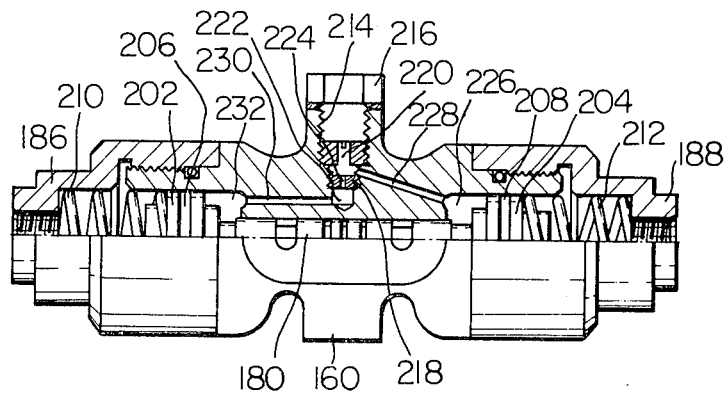
FIG. 3 is a schematic cross sectional plan view, partly in cross section, of the control valve shown in FIG. 2.

As shown in FIGS. 2 and 3, the control valve 118 includes a valve housing 160 having formed therein a bore 162, opposite bores 164 and 166 of greater cross-sectional areas merging with the bore 162 and terminating in openings 168 and 170, respectively, first and second ports 172 and 174 connected to the conduits 120 and 116, respectively and third and fourth ports 176 and 178 connected to the conduits 136 and 138, respectively. The ports 172, 174, 176 and 178 open into the bore 162. A valve spool 180 is slidably fitted in the bore 162 and extend in the bores 164 and 166. The valve spool 180 has formed therein a first annular groove 182 which interconnects the first and second ports 172 and 174 and a second annular groove 184 which interconnects the third and fourth ports 176 and 178. Seals 185 such as O-rings form fluid tight seals between the annular grooves 182 and 184 of the valve spool 180. End caps 186 and 188 are fixedly mounted on the valve housing 160 at opposite ends, respectively. The end caps 186 and 188 have formed therein bores 190 and 192 aligned with the bores 164 and 166 to form fluid chambers 194 and 196, respectively. The end caps 186 and 188 have also formed therein first and second ports 198 and 200 opening into the bores 190 and 192 and connected with the conduits 148 and 150 communicating with the cylinder chambers 44 and 46 of the suspension struts 12 and 14, respectively. Pistons 202 and 204 are fixedly secured to the valve spool 180 at opposite ends thereof. The pistons 202 and 204 are slidably fitted in the bores 164 and 166. Seals 206 and 208 such as O-rings are provided to form fluid tight seals. Biasing means 210 and 212 such as compression springs are disposed between the end cap 186 and piston 202 and between the end cap 188 and piston 204 to hold the valve spool 180 in the neutral position as shown in FIGS. 2 and 3 in which the annular grooves 182 and 184 interconnect the ports 172 and 174 and the ports 176 and 178, respectively. The valve spool 180 is biased in opposite directions by the pressurs of the hydraulic fluids in the cylinder chambers 44 and 46 acting on the pistons 202 and 204, respectively and is movable from the neutral position by the difference between the pressures of the hydraulic fluids in the cylinder chambers 44 and 46 which exceeds a predetermined value against the action of the spring 210 or 212. It will be understood that the fluid chambers 194 and 196 of the control valve 118 may communicate through the ports 198 and 200 with the cylinder chambers 48 and 50 of the suspension struts 20 and 22 in lieu of the cylinder chambers 44 and 46, respectively. As shown in FIG. 3, the valve housing 160 has formed at its central portion a bore 214 which is closed by a plug 216. The interior of the bore 214 is divided by a partition member 218 into upper and lower chambers 220 and 222 in the drawing. The partition member 128 has formed therethrough an orifice or throttle 224 which limits communication with the upper and lower chambers 220 and 222. The upper chamber 220 communicates through a conduit 228 with a chamber 226 defined between the valve housing 160 and piston 204. The lower chamber 222 communicates through a conduit 230 with a chamber 232 defined between the valve housing 160 and piston 202. The chambers 220, 222, 226 and 232, orifice 224 and conduits 228 and 230 are filled with a hydraulic fluid. The hydraulic fluid is preferably the same as that in the cylinder chambers 44, 46, 48 and 50. The orifice 224 gives a resistance to the hydraulic fluid flowing through the orifice when a reciprocating movement of the valve spool 180 of the control valve 118 is caused by the activation of the suspension struts 12 and 14, to damp the reciprocating movement of the valve spool 180.

The operation of the hydropneumatic suspension system is as follows.

When the vehicle travels on a clockwise curved road, the vehicle body is caused to incline to the left side of the vehicle due to a centrifugal force acting on the vehicle. At this time, the suspension units 12 and 20 undergo compression and shorten the effective lengths thereof to increase the pressures of the hydraulic fluids in the cylinder chambers 44 and 48, while the suspension units 14 and 22 undergo expansion to lengthen the effective lengths thereof and to reduce the pressures of the hydraulic fluids in the cylinder chambers 46 and 50. Accordingly, the pressure of the hydraulic fluid in the cylinder chamber 44 is higher than that of the hydraulic fluid in the cylinder chamber 46 and is transmitted to the piston 202 of the control valve 118 by way of the conduit 148. When the difference between the pressures of the hydraulic fluids in the cylinder chambers 44 and 46 exceeds a predetermined value, the valve spool 180 is moved to a position to stop communications between the first and second ports 172 and 174 and between the third and fourth ports 176 and 178. Thus, the level regulating devices 152, 154, 156 and 158 are isolated from the pump 108 and reservoir 128. Accordingly, although the means 152, 154, 156 and 158 provide communication between the respective cylinder chambers 44, 46, 48 and 50 and the control valve 118 in response to variations in the load of the vehicle, a short time after start of the curvilinear travel of the vehicle, the level regulating devices are prevented from functioning to correct the position of the vehicle body and hence the vehicle body remains inclined to the left side of the vehicle.

When the vehicle shifts from the curvilinear travel to a rectilinear travel, the vehicle body is held in a horizontal position, since no centrifugal force acts on the vehicle body. In this instance, since the vehicle body is not caused to abnormally incline to the right side of the vehicle, the riding quality is not reduced at all. At this time, the pressures of the hydraulic fluids in the cylinder chambers 44 and 48 are equal to those of the hydraulic fluids in the cylinder chambers 46 and 50. Accordingly, the valve spool 180 of the control valve 118 is moved to the neutral position in which the annular grooves 182 and 184 interconnect the ports 172 and 174 and the ports 176 and 178, respectively. Hence, the level regulating devices 152, 154, 156 and 158 can function to maintain the level of the vehicle body substantially constant.

When the vehicle shifts from the travel on the clockwise curved road to a travel on a counterclockwise curved road, the vehicle body is inclined to the right side of the vehicle. Accordingly, the pressure of the hydraulic fluid in the cylinder chamber 46 is higher than that of the hydraulic fluid in the cylinder chamber 44. As a result, the valve spool 180 of the control valve 118 is moved through the neutral position to a position to stop communications between the ports 172 and 174 and between the ports 176 and 178. Thus, the level regulating devices 152, 154, 156 and 158 are isolated from the pump 108 and reservoir 128 and cannot function to correct the position of the vehicle body. In this instance, since the vehicle body is not excessively inclined to the right side of the vehicle, the stability of the vehicle is not reduced during the travel.

Although the invention has been described such that the fluid chambers 194 and 196 of the control valve 118 communicate respectively with the cylinder chambers 44 and 46 or 48 and 50 of the suspension units 12 and 14 or 20 and 22 cooperating with the front or rear left and right wheels 16 and 18 or 24 and 26, the invention can be modified such that the fluid chambers 194 and 196 of the control valve 118 communicate respectively with the cylinder chambers 44 and 48 or 46 and 50 of the suspension units 12 and 20 or 14 and 22 cooperating with the right or left front and rear wheels 16 and 24 or 18 and 26. In such a modification, the control valve 118 is operable to stop communications between the ports 172 and 174 and between the ports 176 and 178 in response to the difference between the pressures of the hydraulic fluids in the cylinder chambers 44 and 48 or 46 and 50 during acceleration and braking of the vehicle. As a result, the level regulating devices 152, 154, 156 and 158 cannot function to correct the position of the vehicle body horizontal during acceleration and braking of the vehicle.

It will be thus understood that a vehicle body can be prevented from being excessively inclined in a transverse direction to maintain the stability of the vehicle when a vehicle shifts from a travel on a curved road to a travel on an oppositely curved road or from being undesirably inclined in a longitudinal direction to secure a proper riding quality after the end of acceleration and braking of the vehicle, by connecting a control valve to cylinder chambers of suspension struts cooperating with the front or rear left and right wheels of the vehicle or cooperating with the left or right front and rear wheels of the vehicle.

Although the level regulating devices 152, 154, 156 and 158 are located interiorly of the suspension struts 12, 14, 20 and 22, respectively in the embodiment of FIG. 1, the invention can be applied to a hydropneumatic suspension system comprising level regulating devices located exteriorly of the hydropneumatic suspension struts, respectively.

What is claimed is:

1. A suspension system of wheeled vehicle, comprising; a plurality of retractable and extensible suspension struts each having chamber of variable volume filled with pressurized fluid, said chambers of said plurality of struts being fluidly communicable with a pressurized fluid source to supply pressurized fluid into said chambers for extension of said plurality of struts; a plurality of level regulating means disposed between said chambers of said plurality of struts and said source and fluidly communicable with said source; and a control valve disposed between said plurality of level regulating means and said source to control fluid communication therebetween; said control valve being responsive to the difference between the pressures of the fluids in said chambers of two struts of said plurality of struts to block said fluid communication between said plurality of level regulating means and said source; each of said plurality of level regulating means, when said control valve unblocks said fluid communication between said plurality of level regulating means and said source, being able to control fluid communication between said chamber of the corresponding strut and said source.

2. A suspension system of a wheeled vehicle, comprising; a plurality of retractable and extensible suspension struts each having chamber of variable volume filled with pressurized fluid; said chambers of said plurality of struts being fluidly communicable with a source of pressurized fluid to supply pressurized fluid into said chambers for extension of said plurality of struts; said chambers of said plurality of struts being also fluidly communicable with a reservoir to discharge fluid thereinto for retraction of said plurality of struts; a plurality of level regulating means disposed between said chambers of said plurality of struts and said source and between said chambers of said plurality of struts and said reservoir and fluidly communicable with said source and reservoir; and a control valve disposed between said plurality of level regulating means and said source and between said plurality of level regulating means and said reservoir to control fluid communication therebetween, said control valve being responsive to the difference between the pressures of the fluids in said chambers of two struts of said plurality of struts to block said fluid communications between said plurality of level regulating means and said source and between said plurality of level regulating means and said reservoir; each of said plurality of level regulating means, when said control valve unblocks said fluid communication between said plurality of level regulating means and said source and between said plurality of level regulating means and said reservoir, being able to control fluid communications between said chamber of the corresponding strut and said source and between said chamber of the corresponding strut and said reservoir.

3. A suspension system as claimed in claim 2, in which said two suspension struts are operatively connected with front left and right wheels of said vehicle, respectively.

4. A suspension system as claimed in claim 2, in which said two suspension struts are operatively connected with rear left and right wheels of said vehicle, respectively.

5. A suspension system as claimed in claim 2, in which said two suspension struts are operatively connected with left front and rear wheels of said vehicle, respectively.

6. A suspension system as claimed in claim 2, in which said two suspension struts are operatively connected with right front and rear wheels of said vehicle, respectively.

7. A suspension system as claimed in claim 2, in which said control valve has a first port communicating with said source, a second port communicating with said plurality of level regulating means, a third port communicating with said plurality of level regulating means, a fourth port communicating with said reservoir, a valve spool slidably disposed in said valve providing communications between said first and second ports and between said third and fourth ports in a neutral position thereof, biasing means urging said valve spool into said neutral position, and two chambers fluidly communicating respectively with said chambers of said two suspension struts, said valve spool being axially biased in opposite directions by the pressures of the fluids in said two chambers, respectively.

8. A suspension system as claimed in claim 2, further comprising a plurality of hydropneumatic spring means positioned relative to said plurality of suspension struts, respectively, each of said hydropneumatic spring means having a casing and a flexible partition member dividing said casing into a gas chamber filled with gas under pressure and a fluid chamber filled with hydraulic fluid under pressure and communicating with said chamber of the corresponding suspension strut.

* * * * *